United States Patent
Kondo et al.

(10) Patent No.: US 11,614,701 B2
(45) Date of Patent: Mar. 28, 2023

(54) IMAGE FORMING APPARATUS

(71) Applicant: KYOCERA Document Solutions Inc., Osaka (JP)

(72) Inventors: Akihiro Kondo, Osaka (JP); Takashi Eiki, Osaka (JP); Ryohei Tokunaga, Osaka (JP); Yuta Kitabayashi, Osaka (JP); Rina Kikugawa, Osaka (JP); Hiroki Kawasaki, Osaka (JP); Shunsaku Fujii, Osaka (JP); Tei To, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/656,402

(22) Filed: Mar. 24, 2022

(65) Prior Publication Data

US 2022/0308507 A1 Sep. 29, 2022

(30) Foreign Application Priority Data

Mar. 29, 2021 (JP) .............................. JP2021-055895

(51) Int. Cl.
*G03G 15/20* (2006.01)
*H04N 1/00* (2006.01)

(52) U.S. Cl.
CPC ..... *G03G 15/2025* (2013.01); *H04N 1/00832* (2013.01)

(58) Field of Classification Search
CPC .................................................. G03G 15/2025
See application file for complete search history.

(56) References Cited

U.S. PATENT DOCUMENTS

| 2011/0052245 | A1* | 3/2011 | Shinshi | G03G 15/2025 |
| | | | | 399/92 |
| 2016/0018764 | A1* | 1/2016 | Takagi | G03G 15/2042 |
| | | | | 399/70 |
| 2018/0292782 | A1* | 10/2018 | Nojima | G03G 15/2017 |
| 2018/0329342 | A1* | 11/2018 | Seshita | G03G 15/2025 |
| 2019/0219954 | A1* | 7/2019 | Okuno | G03G 15/205 |
| 2020/0233342 | A1* | 7/2020 | Saeki | G03G 15/2032 |
| 2020/0379384 | A1* | 12/2020 | Sam | G03G 15/2053 |
| 2021/0389706 | A1* | 12/2021 | Tokunaga | G03G 15/2053 |

FOREIGN PATENT DOCUMENTS

JP  2017-107086 A  6/2017

* cited by examiner

*Primary Examiner* — Carla J Therrien
(74) *Attorney, Agent, or Firm* — Studebaker & Brackett PC

(57) ABSTRACT

A fixing belt heats and fixes a toner image. A pressure roller rotates the fixing belt while in contact with the fixing belt. A heater heats the fixing belt. A lubricating oil forms an oil film between the heater and an inner peripheral surface of the fixing belt. A pressure roller driver rotates the pressure roller so that the lubricating oil causes the fixing belt to be out of contact with the heater.

11 Claims, 10 Drawing Sheets

IMAGE FORMING APPARATUS

INCORPORATION BY REFERENCE

The present application claims priority under 35 U.S.C. § 119 to Japanese Patent Application No. 2021-055895, filed on Mar. 29, 2021. The contents of this application are incorporated herein by reference in their entirety.

BACKGROUND

The present disclosure relates to an image forming apparatus.

In general, an image forming apparatus includes a nip forming member that presses a pressure roller against a fixing belt to form a nip.

SUMMARY

An image forming apparatus according to an aspect of the present disclosure includes a fixing device. The fixing device includes a fixing belt, a pressure roller, a heater, a lubricating oil, and a pressure roller driver. The fixing belt heats and fixes a toner image transferred to a sheet. The pressure roller rotates the fixing belt while in contact with the fixing belt. The heater heats the fixing belt. The lubricating oil forms an oil film between the heater and an inner peripheral surface of the fixing belt. The pressure roller driver rotates the pressure roller so that the lubricating oil causes the fixing belt to be out of contact with the heater.

DETAILED DESCRIPTION

Figure 1:
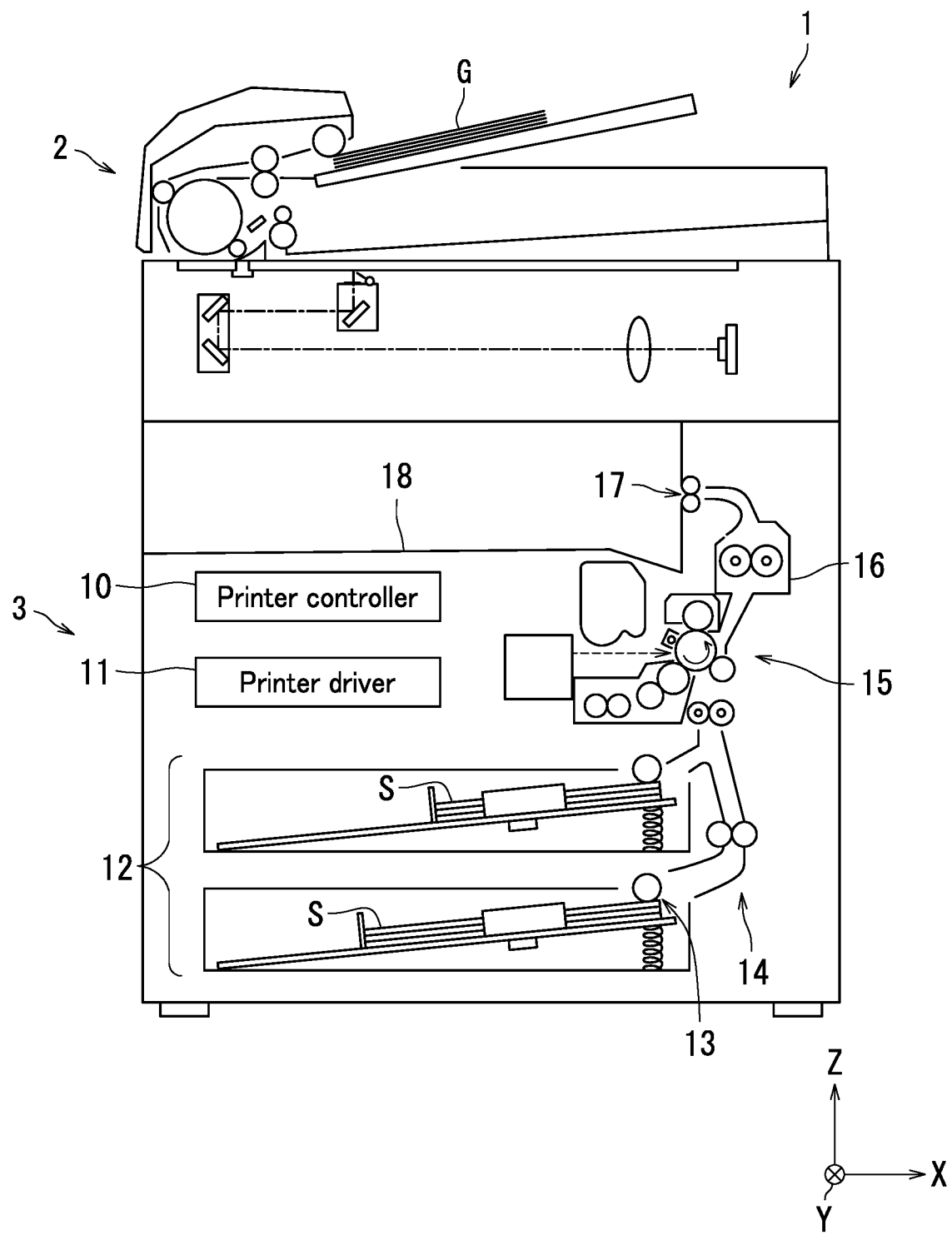
FIG. 1 illustrates a multifunction peripheral including an image forming apparatus according to an embodiment of the present disclosure.

Hereinafter, an embodiment of the present disclosure will be described with reference to the drawings. In the drawings, the same or corresponding elements are assigned the same reference signs, and descriptions thereof are not repeated. In the present embodiment, the drawings depict X-, Y- and Z-axes that are orthogonal to each other. The Z-axis is parallel to a vertical plane and the X- and Y-axes are parallel to a horizontal plane.

In the present embodiment, a direction of the Z-axis may be described as a "primary scanning direction". Further, a direction of the Y-axis may be described as a "secondary scanning direction". A direction of the X-axis may be described as a "direction orthogonal to the primary and secondary scanning directions".

Figure 2:
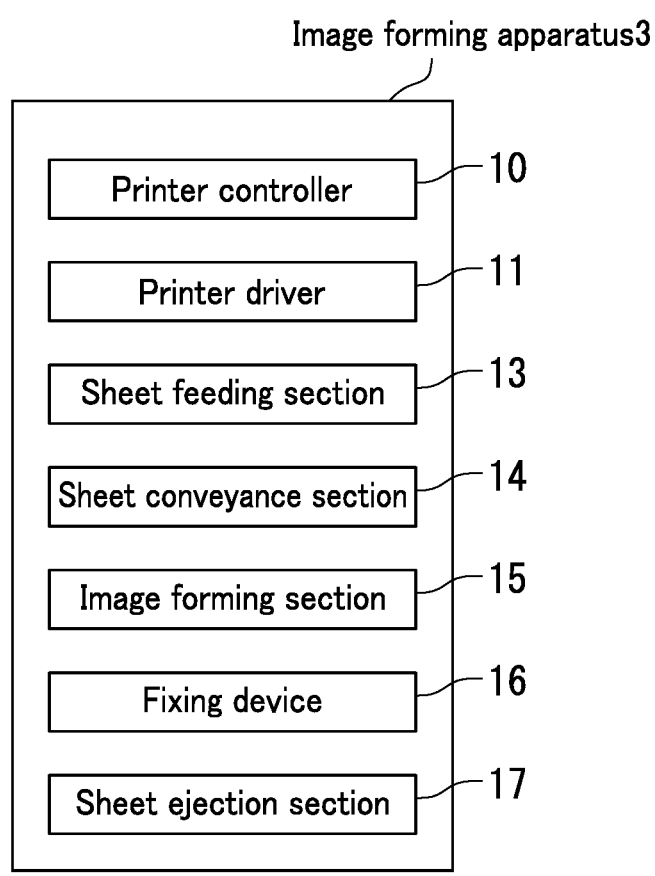
FIG. 2 is a block diagram illustrating a configuration of the image forming apparatus according to the present embodiment.

The configuration of a multifunction peripheral 1 will be described with reference to FIG. 1. FIG. 1 is a diagram illustrating the multifunction peripheral 1 including a fixing device 16 in the present embodiment. Further, the configuration of an image forming apparatus 3 including the fixing device 16 in the present embodiment will be described with reference to FIG. 2. FIG. 2 is a block diagram illustrating the configuration of the image forming apparatus 3 including the fixing device 16 in the present embodiment.

As illustrated in FIG. 1, the multifunction peripheral 1 includes a document reading device 2 and the image forming apparatus 3. The multifunction peripheral 1 is, for example a multifunction printer (MFP) combined with functions such as a scanner, a photocopier, a printer, a copying machine, and a facsimile.

The document reading device 2 includes, for example, a document tray, a document feeding section, a document conveyance section, a document reading section, an optical member, a document ejection section, and a document ejection tray.

The image forming apparatus 3 includes a printer controller 10, a printer driver 11, sheet trays 12, sheet feeding sections 13, a sheet conveyance section 14, an image forming section 15, a fixing section 16 (fixing device 16), a sheet ejection section 17, and a sheet ejection tray 18.

The printer controller 10 controls respective operations of the sections in the image forming apparatus 3. The printer controller 10 may function as a controller that controls respective operations of the sections in the multifunction peripheral 1. Specific examples of the printer controller 10 include a central processing unit (CPU), a micro-processing unit (MPU), and an application specific integrated circuit (ASIC).

The printer controller 10 enables size control of a sheet S that is to pass through the fixing device 16. According to a job instruction, the printer controller 10 selects the size of the sheet S, and gives the sheet feeding sections 13 an instruction on the size of the sheet S to be fed.

The printer driver 11 drives each section of the image forming apparatus 3. The printer driver 11 may be a driver that operates each section of the multifunction peripheral 1. Specific examples of the printer driver 11 include an electric motor, an electromagnetic solenoid, a hydraulic cylinder, and a pneumatic cylinder.

Each sheet tray 12 houses sheets S. The sheets S are included in examples of a recording medium. Each sheet tray 12 may include a tray and an elevating member. Each sheet feeding section 13 picks up and feeds a sheet S housed in a corresponding sheet tray 12. A pickup roller is included in specific examples of the sheet feeding sections 13.

The sheet conveyance section 14 conveys a sheet S fed from a sheet tray 12. The sheet conveyance section 14 has a conveyance path. The conveyance path extends from each sheet tray 12 as a starting point to the sheet ejection section 17 via the image forming section 15 and the fixing section 16. The sheet conveyance section 14 may include conveyance rollers and a resist roller in the conveyance path.

A plurality of conveyance rollers may be arranged in the conveyance path to convey the sheet S. The resist roller adjusts the timing of conveying the sheet S to the image forming section 15. The sheet conveyance section 14 conveys the sheet S from each sheet tray 12 to the sheet ejection section 17 via the image forming section 15 and the fixing section 16.

The image forming section 15 electrographically forms a toner image (not shown) on the sheet S based on document image data. The document image data indicates, for example an image of a document G.

The fixing section 16 applies heat and pressure to the toner image developed on the sheet S to fix the toner image on the sheet S. The fixing section 16 may be described as the "fixing device 16".

The sheet ejection section 17 ejects the sheet S to the outside of the housing of the multifunction peripheral 1 (image forming apparatus 3). An ejection roller is included in specific examples of the sheet ejection section 17.

The sheet ejection tray 18 holds the sheet S ejected by the sheet ejection section 17.

Figure 3:
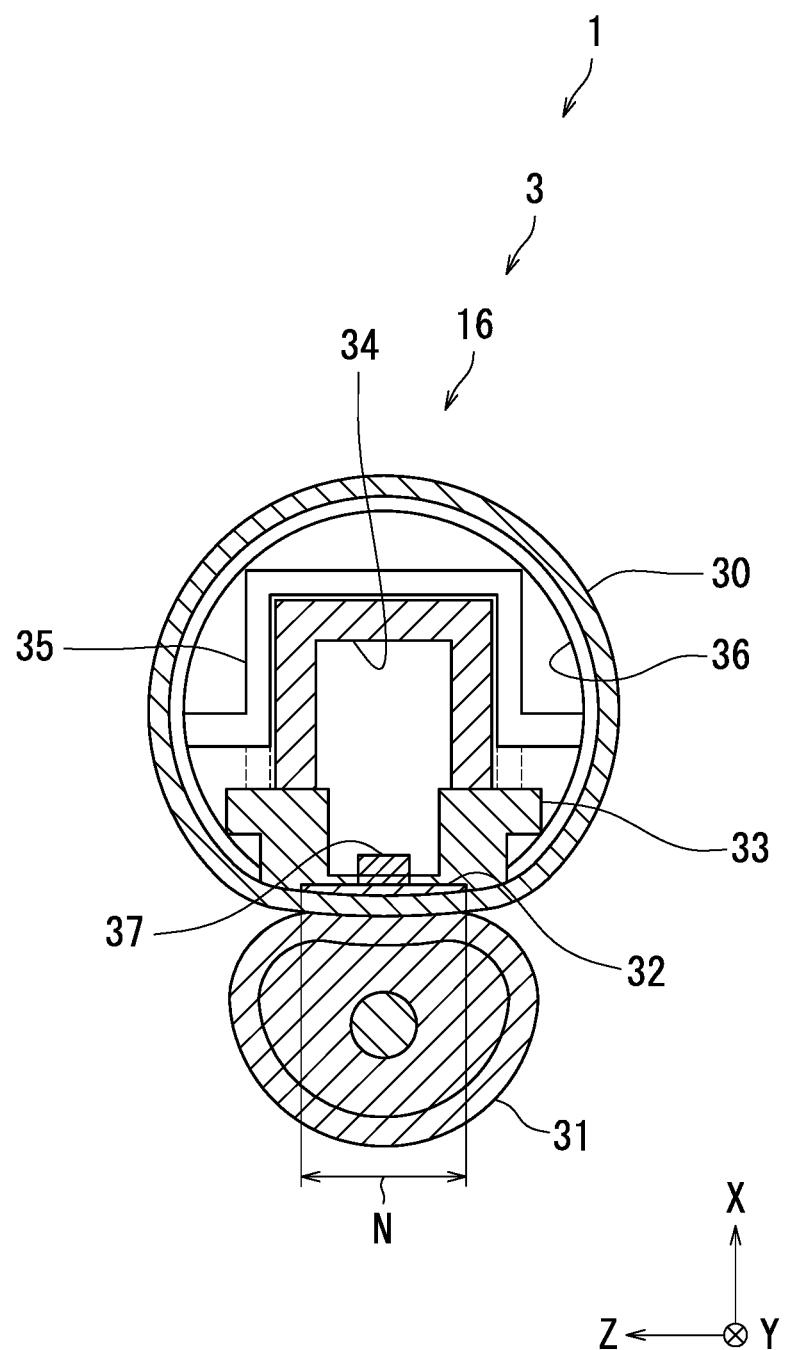
FIG. 3 is a cross-sectional view illustrating a configuration of a fixing device included in the image forming apparatus.

Next, a detailed configuration of the fixing device 16 in the present embodiment will be described with reference to FIG. 3. FIG. 3 is a cross-sectional view illustrating the configuration of the fixing device 16 in the present embodiment.

As illustrated in FIG. 3, the fixing device 16 includes a fixing belt 30, a pressure member 31, a heater 32, a heater holding member 33, a stay sheet metal 34, a stay sheet metal holding section 35, a fixing belt holding section 36, and a temperature measuring section 37.

In the image forming section 15 illustrated in FIG. 1, the toner image is formed on the fixing belt 30. The sheet S (FIG. 1) conveyed to the fixing device 16 is heated such that the toner image transferred to the sheet S is heated and fixed.

The fixing belt 30 illustrated in FIG. 3 is an endless belt. The fixing belt 30 is substantially cylindrical in shape. The fixing belt 30 is flexible.

The fixing belt 30 includes a plurality of layers. For example, the fixing belt 30 includes a polyimide layer containing polyimide, an elastic layer containing an elastic material such as silicone rubber, and a release layer. The release layer is formed on the outer peripheral surface of the polyimide layer. The release layer is, for example a heat-resistant film made of fluoropolymer.

The pressure member 31 is driven to rotate while pressing (being in contact with) the fixing belt 30, thereby making the fixing belt 30 rotate along therewith. The pressure member 31 is cylindrical in shape and faces the fixing belt 30. A pressure roller 31 is included in examples of the pressure member 31. The pressure member 31 may hereinafter be described as the "pressure roller 31".

The pressure roller 31 has a cylindrical core metal, a cylindrical elastic layer, and a release layer. The elastic layer is formed on the core metal. The release layer is formed on the surface of the elastic layer such that it covers the elastic layer.

The core metal is formed of, for example stainless steel or aluminum. The elastic layer is elastic and formed of, for example silicone rubber. The release layer is formed of, for example a fluoropolymer.

The heater 32 is connected to a power supply (not illustrated) and generates heat. The heater 32 heats the fixing belt 30. The heater 32 is placed at a position facing the inner peripheral surface of the fixing belt 30. The heater 32 may be pressed against the inner peripheral surface of the fixing belt 30 by a pressing member (not illustrated).

The heater 32 is, for example a planar heater or an elongated thin plate heater. A ceramic heater is included in examples of the heater 32. The ceramic heater includes a ceramic substrate and a resistance heat generator. The heater 32 is, for example 1 mm in thickness. The heater 32 receives the pressure from the pressure roller 31 via the fixing belt 30.

The pressure roller 31 presses against the fixing belt 30, whereby a nip portion N is formed at a contact portion between the fixing belt 30 and the pressure roller 31. When the pressure roller 31 presses against the fixing belt 30, the inner peripheral surface of the fixing belt 30 presses against the heater 32. Therefore, the fixing belt 30 is heated by the heater 32, and the toner image formed on the sheet S (FIG. 1) passing through the nip portion N is fixed to the sheet S.

Lubricating oil is applied to the inner peripheral surface of the fixing belt 30. The lubricating oil is interposed between the fixing belt 30 and the heater 32. The lubricating oil forms an oil film between the heater 32 and the inner peripheral surface of the fixing belt 30. The lubricating oil reduces the friction between the fixing belt 30 and the heater 32.

Grease is included in specific examples of the lubricating oil. Grease has a higher viscosity $\eta$ than oil and scarcely has fluidity. It is therefore semi-solid or semi-fluid at room temperature. One example of grease is a semi-solid or solid substance formed as a uniform dispersion of thickeners, such as calcium, sodium, lithium, and aluminum soaps (fatty acid salts), in a liquid lubricating oil.

The heater holding member 33 holds the heater 32 that heats the fixing belt 30, and guides and allows the fixing belt 30 to rotate around the fixing belt 30.

The stay sheet metal 34 reinforces the heater holding member 33. The stay sheet metal 34 is, for example an elongated thin metal stay member. The stay sheet metal 34 may be formed in a square bracket shape, a U-shape, or a V-shape.

The stay sheet metal holding section 35 holds the stay sheet metal 34 that is fixed to the heater holding member 33.

The fixing belt holding section 36 guides and allows the fixing belt 30 to rotate therearound.

Figure 4:
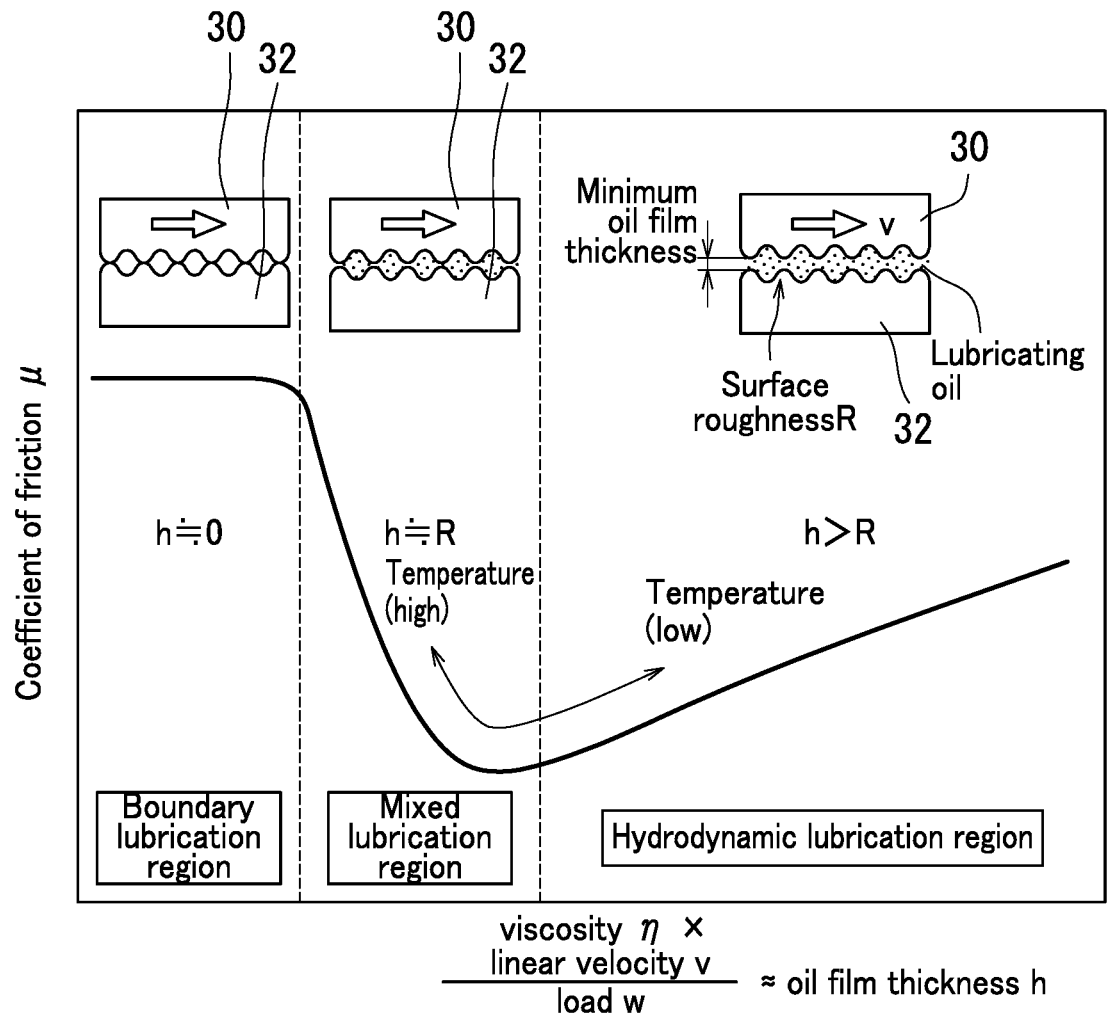
FIG. 4 is a diagram illustrating a Stribeck curve of a lubricating oil used for the fixing device.

Next, a Stribeck curve illustrating the characteristics of the lubricating oil will be described with reference to FIG. 4. FIG. 4 illustrates a Stribeck curve of the lubricating oil used for the fixing device 16.

As illustrated in FIG. 4, the characteristics of the lubricating oil can be represented as the Stribeck curve where the vertical axis represents the coefficient of friction $\mu$ and the horizontal axis represents the oil film thickness h (=viscosity $\eta \times$ linear velocity v/load w (Equation 1)). The viscosity $\eta$ indicates the viscosity $\eta$ of the lubricating oil. The linear velocity v indicates the linear velocity v of the peripheral surface of the pressure roller 31. The load w indicates the load at which the pressure roller 31 presses the fixing belt 30.

The characteristics of the lubricating oil are divided into a boundary lubrication region, a mixed lubrication region, and a hydrodynamic lubrication region.

The boundary lubrication region is a region where the minimum oil film thickness ho of the lubricating oil is almost 0. When the minimum oil film thickness ho of the lubricating oil is approximately equal to 0, the lubricating oil is high in temperature and low in viscosity $\eta$. This causes the contact area between the fixing belt 30 and the heater 32 to become large, and increases the friction between the fixing belt 30 and the heater 32.

In the boundary lubrication region, (viscosity η×linear velocity v) is small and the load w is large as represented by (Equation 1).

If the heater 32 has an unused region through which the sheet S does not pass during the fixing operation for the sheet S by the fixing device 16, the lubricating oil in the unused region becomes hot and the viscosity η becomes low. Therefore, the minimum oil film thickness ho of the lubricating oil is approximately equal to 0, which increases the friction between the fixing belt 30 and the heater 32. The state where the lubricating oil is in the boundary lubrication region is not a preferable state because respective lives of the fixing belt 30 and the heater 32 are shorted.

In the mixed lubrication region, the minimum oil film thickness ho of the lubricating oil is substantially equal to the surface roughness R of the fixing belt 30 or the heater 32. When the minimum oil film thickness ho of the lubricating oil is approximately equal to the surface roughness R, the lubricating oil is lower in temperature than it is in the boundary lubrication region and the viscosity η is increased. This causes the contact area between the fixing belt 30 and the heater 32 to become small, and decreases the friction between the fixing belt 30 and the heater 32.

However, even in the mixed lubricating region, the lubricating oil tends to shift to the boundary lubrication region due to a change in the situation, which is not always preferable to maintaining the performance of lubricating oil.

The lubricating oil used in the present embodiment is described. As illustrated in FIG. 4, in the boundary lubrication region and the mixed lubrication region where the value of (viscosity η×linear velocity v) in (Equation 1) is small, the coefficient of friction μ decreases as the value of the product increases. Further, in the hydrodynamic lubrication region where the value of (viscosity η×linear velocity v) in (Equation 1) is large, the coefficient of friction μ increases as the value of (viscosity η×linear velocity v) increases.

The viscosity η of the lubricating oil varies according to the temperature of the lubricating oil and the durability conditions. For example, in friction science, when lubricating oil is present between two objects that move relative to each other, the lubrication state changes the relationship between the value of "product of viscosity η and linear velocity v" on the horizontal axis in FIG. 4 and the "coefficient of friction μ" on the vertical axis in FIG. 4.

The lubricating oil provides the hydrodynamic lubrication region where the inner peripheral surface of the fixing belt 30 is separated from the heater 32 (minimum oil film thickness ho of lubricating oil>surface roughness R). In the hydrodynamic lubrication region illustrated in FIG. 4, when the viscosity η of the lubricating oil is high, the shearing stress of the lubricating oil between the heater 32 and the inner peripheral surface of the fixing belt 30 increases. This increases the coefficient of friction μ between the heater 32 and the inner peripheral surface of the fixing belt 30.

On the other hand, when the viscosity η of the lubricating oil is low, the shearing stress of the lubricating oil between the heater 32 and the inner peripheral surface of the fixing belt 30 decreases. This decreases the coefficient of friction μ between the heater 32 and the inner peripheral surface of the fixing belt 30.

Therefore, as illustrated in FIG. 4, the lubricating oil has the smallest coefficient of friction μ at the minimum point in the mixed lubrication region. However, as mentioned above, the mixed lubrication region easily shifts to the boundary lubrication region as a risk. It is therefore most desirable to maintain the hydrodynamic lubrication region in order to prolong the life of the lubricating oil even if the coefficient of friction μ becomes slightly large.

The relationship between the value of "product of viscosity η and linear velocity v" on the horizontal axis in FIG. 4 and the "coefficient of friction μ" on the vertical axis in FIG. 4 varies according to the lubrication state of the lubricating oil. Therefore, the viscosity η and the linear velocity v of the lubricating oil are optimized according to the lubrication state of the lubricating oil, and the lubricating oil is shifted to the hydrodynamic lubrication region. This suppresses the increase in the coefficient of friction μ.

Next, the gist of the present disclosure will be described in more detail with reference to FIGS. 5A to 6B.

Figure 5A:
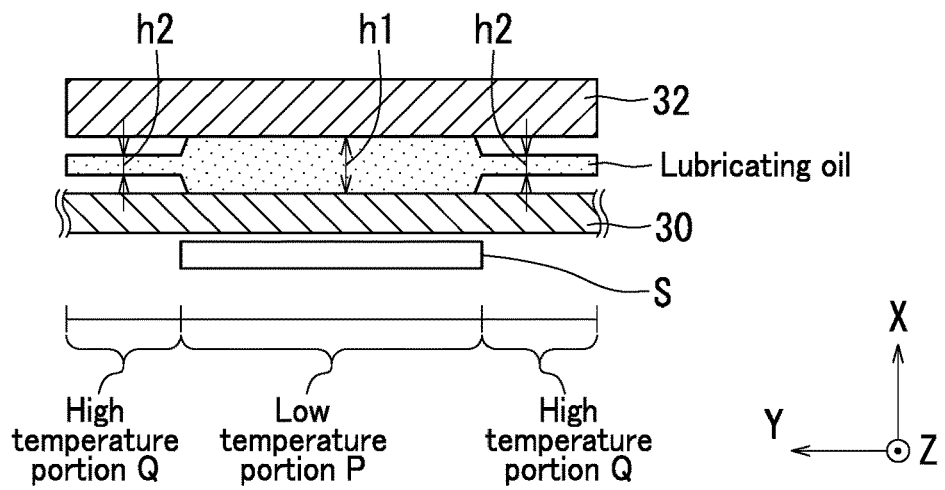
FIGS. 5A to 5C are diagrams illustrating the relationship between the lubricating oil and the Stribeck curve.

FIG. 5A is a cross-sectional view of a main part of the fixing device 16 as viewed in the primary scanning direction. FIG. 5A illustrates continuous fixing processing for a plurality of A5 sheets S which are smaller in size than A4 sheets S when the fixing device 16 can perform fixing processing up to A4 sheets S, for example.

In the fixing device 16, the heat generated by the heater 32 is absorbed by the A5 sheet S in the center through which the A5 sheet S passes, as illustrated in FIG. 5A. Therefore, the lubricating oil between the fixing belt 30 and the heater 32 becomes lower in temperature than both ends. In FIG. 5A, the center, through which the A5 sheet S passes, of the fixing belt 30 in the primary scanning direction is referred to as a "low temperature portion P". The oil film thickness h of the lubricating oil in the low temperature portion P is $h_1$.

On the other hand, the heat generated by the heater 32 is not absorbed by the A5 sheet S at both the ends, through which the A5 sheet S does not pass, of the fixing belt 30 in the primary scanning direction. Therefore, the lubricating oil between the fixing belt 30 and the heater 32 is higher in temperature than the center. In FIG. 5A, both the ends, through which the A5 sheet S does not pass, of the fixing belt 30 in the primary scanning direction are referred to as "high temperature portions Q". The oil film thickness h of the lubricating oil in each high temperature portion Q is $h_2$.

Figure 5B:
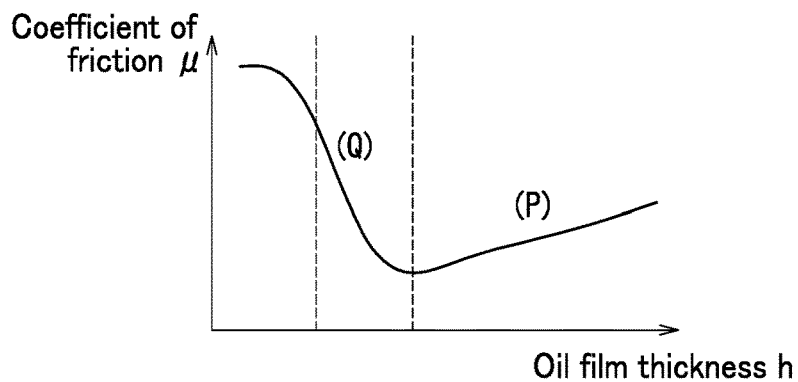

As illustrated in FIG. 5B, the lubricating oil in the low temperature portion P increases in viscosity. The lubricating oil in each high temperature portion Q decreases in viscosity. Therefore, as illustrated in FIG. 5A, the oil film thickness $h_1$ of the lubricating oil in the low temperature portion P is larger than the oil film thickness $h_2$ of the lubricating oil in each high temperature portion Q. That is, $h_1 > h_2$.

Figure 5C:
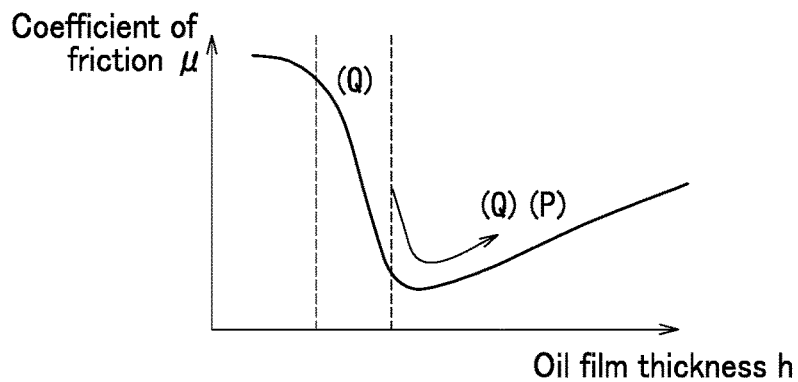

In the embodiment of the present disclosure, adjusting any of (oil film thickness h=viscosity η×linear velocity v/load w) in (Equation 1) enables the oil film thickness h of the lubricating oil in the high temperature portions Q in the boundary lubrication region or the mixed lubrication region (FIG. 4) of the Stribeck curve in FIG. 5B to shift to that in the hydrodynamic lubrication region as illustrated in FIG. 5C.

Further, when the lubricating oil in the low temperature portion P is increased in temperature, the lubricating oil in the low temperature portion P (center) moves to the high temperature portions Q (both ends). As a result, the oil film thickness h of the lubricating oil is flattened in the primary scanning direction.

Figure 6A:
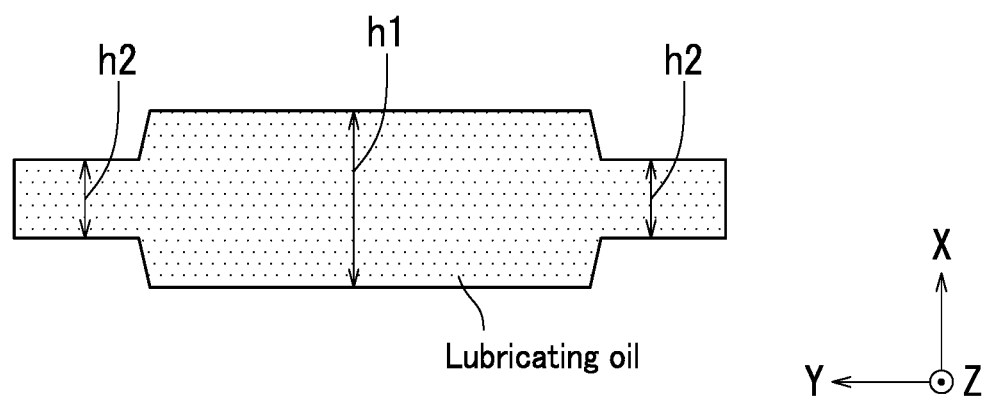
FIGS. 6A and 6B are schematic diagrams illustrating changes in the lubricating oil in the present embodiment.
Figure 6B:
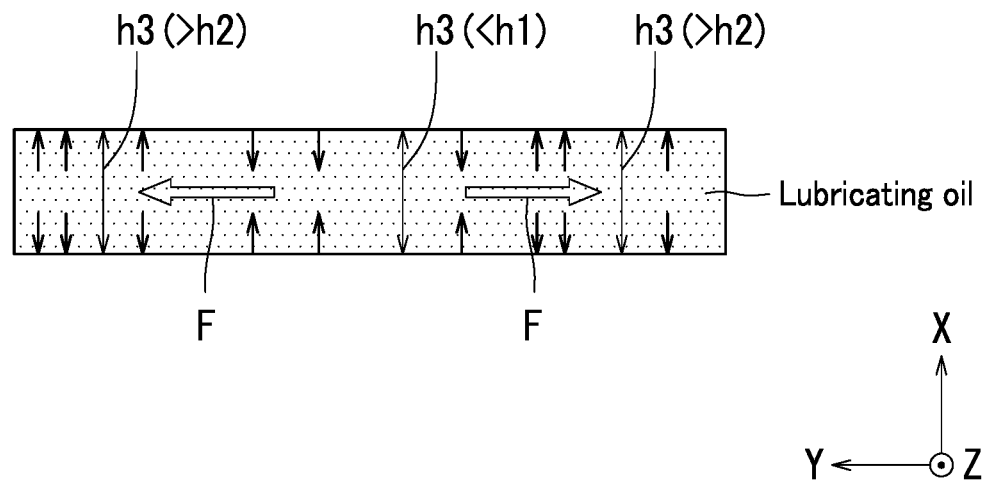

FIGS. 6A and 6B are schematic views illustrating only the lubricating oil in the fixing device 16 described with reference to FIG. 5A.

As illustrated in FIG. 6A, the oil film thickness h of the lubricating oil in the low temperature portion P (center) in the primary scanning direction is $h_1$. The oil film thickness h of the lubricating oil in the high temperature portions Q (both ends) in the primary scanning direction is $h_2$.

In the embodiment of the present disclosure, as illustrated in FIG. 6B, the lubricating oil in the low temperature portion P increases in temperature, and therefore the oil film thickness h decreases from $h_1$ to $h_3$. The lubricating oil in the low temperature portion P decreases in viscosity η, which improves fluidity, and easily moves to the high temperature portions Q. Therefore, the oil film thickness h of the lubricating oil in the high temperature portions Q increases from $h_2$ to $h_3$.

Therefore, as illustrated in FIG. 6B, the oil film thickness h of the lubricating oil in the primary scanning direction is flattened to $h_3$, and the lubricating oil is generally stabilized in the hydrodynamic lubrication region of the Stribeck curve.

Figure 7:
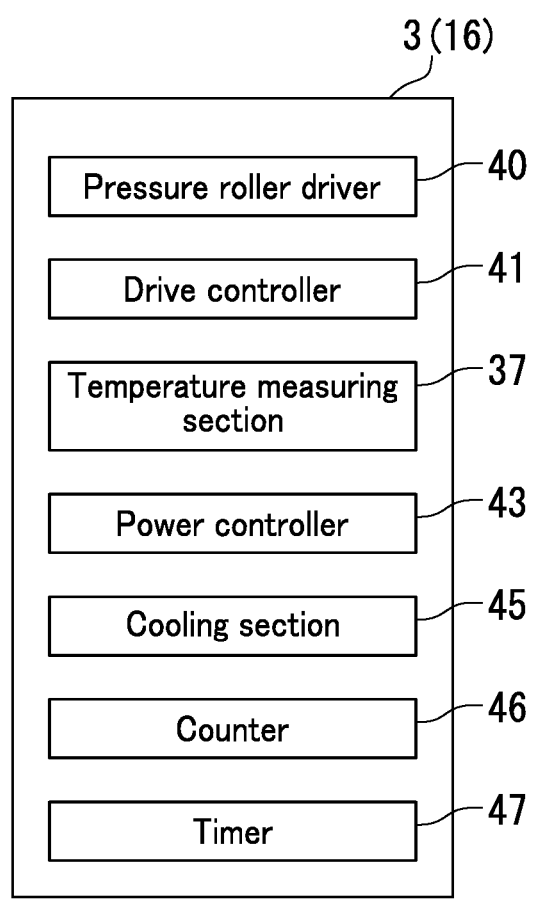
FIG. 7 is a block diagram illustrating a control configuration of the image forming apparatus or the fixing device in the present embodiment.
Figure 8:
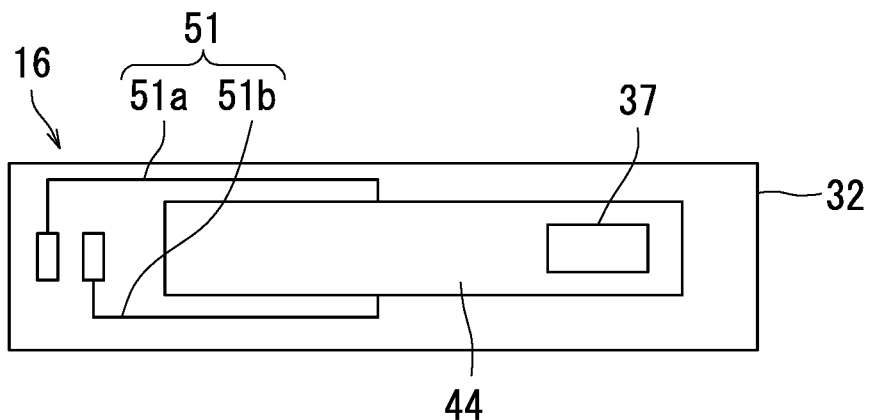
FIG. 8 is a plan view illustrating a configuration of a heater of the fixing device.
Figure 9:
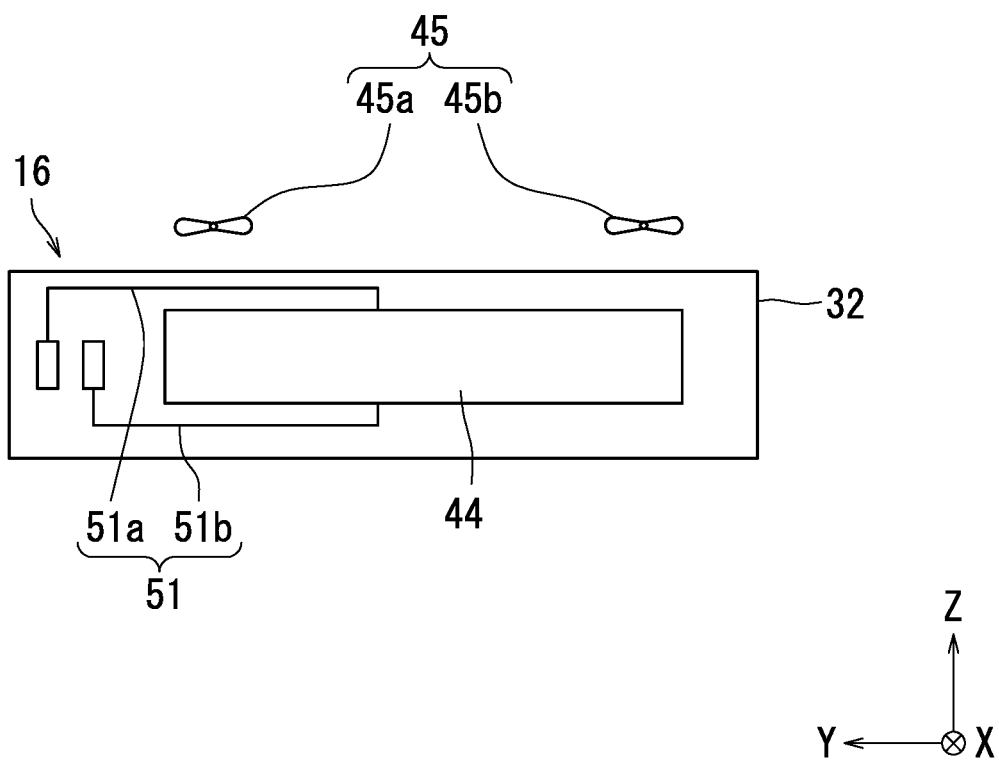
FIG. 9 is a plan view illustrating a configuration of a cooling section provided in a heater of the fixing device.
Figure 10:
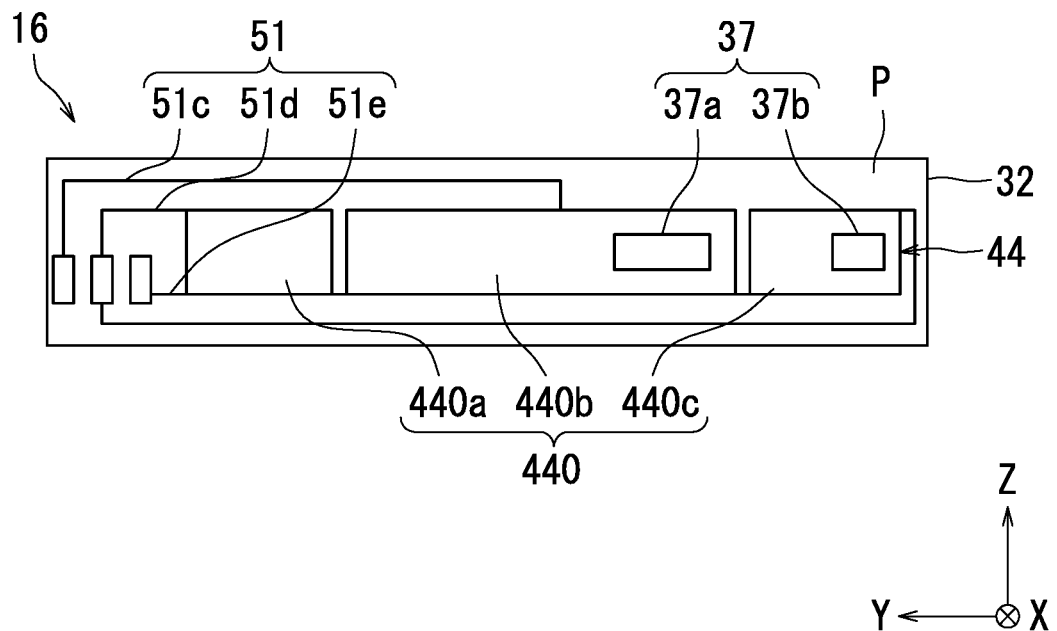
FIG. 10 is a plan view illustrating a configuration of a split heater.
Figure 11:
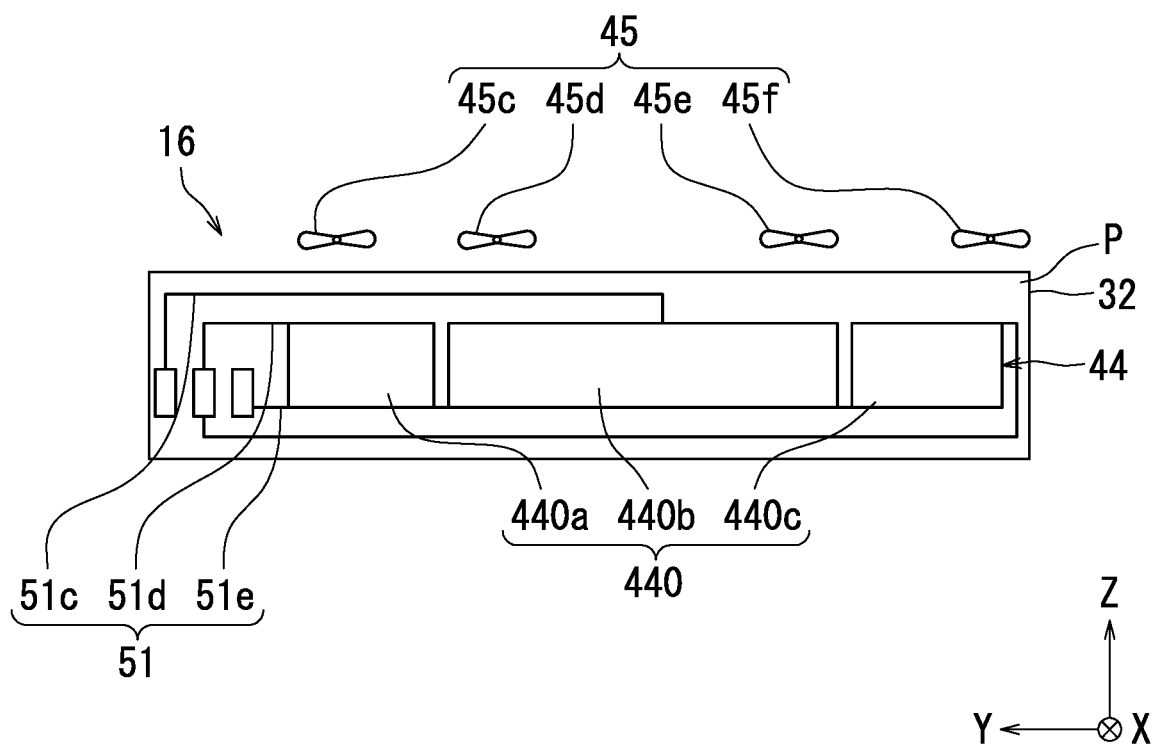
FIG. 11 is a plan view illustrating a configuration of a cooling section of a split heater.

Next, the control of the fixing device 16 of the image forming apparatus 3 according to the present embodiment and the detailed structure of the heater 32 will be described with reference to FIGS. 7 to 11 in addition to FIGS. 1 to 6B. FIG. 7 is a block diagram illustrating a control configuration of the image forming apparatus 3 or the fixing apparatus 16 in the present embodiment. FIG. 8 is a plan view illustrating the configuration of a heater 32 of the fixing device 16. FIG. 9 is a plan view illustrating the configuration of a cooling section 45 provided in a heater 32 of the fixing device 16. FIG. 10 is a plan view illustrating the configuration of a split heater. FIG. 11 is a plan view illustrating the configuration of a cooling section 45 of a split heater.

As illustrated in FIG. 7, the fixing device 16 includes a pressure roller driver 40, a drive controller 41, a temperature measuring section 37, a power controller 43, the cooling section 45, a counter 46, and a timer 47.

The pressure roller driver 40 rotates the pressure roller 31 so that the fixing belt 30 is out of contact with the heater 32. A specific example of the pressure roller driver 40 is a motor and a transmission member that transmits the rotational force of the motor to the pressure roller 31, such as gears, a transmission belt, and the like.

In the present embodiment, the lubricating oil is stably maintained in the hydrodynamic lubrication region of the Stribeck curve. The image forming apparatus 3 enables the lubricating oil to cause the fixing belt 30 to be out of contact with the heater 32, thereby suppressing wear of the fixing belt 30 or the heater 32. In addition, respective lives of the fixing device 16 and the image forming apparatus 3 can be extended.

The pressure roller driver 40 may reduce the pressure of the pressure roller 31 on the fixing belt 30 to second pressure lower than first pressure during non-job processing when at least part of the fixing belt 30 is out of contact with at least part of the heater 32.

The non-job processing period may be a warm-up period. The non-job processing period may be a blank period from the end of the preceding job to the start of the next job when a plurality of jobs are processed continuously.

The first pressure is pressure applied to the fixing belt 30 by the pressure roller 31 during a normal warm-up period or a blank period, and is pressure when no imbalance occurs in the oil film thickness h of the lubricating oil. The first pressure may be smaller than the pressure during the fixing operation.

The second pressure is pressure applied to the fixing belt 30 by the pressure roller 31 during a normal warm-up period or a blank period, and is pressure when imbalance occurs in the oil film thickness h of the lubricating oil. The second pressure may be smaller than the first pressure. When imbalance occurs in the oil film thickness h of the lubricating oil, the oil film thickness h of the lubricating oil is reduced so that at least part of the fixing belt 30 is in contact with at least part of the heater 32.

As illustrated in FIG. 5A, continuously fixing small-sized sheets S causes high temperature of the lubricating oil at both ends of the fixing belt 30 in the primary scanning direction. As a result, high temperature portions Q occur. The pressure roller driver 40 controls the pressure roller 31 so that the high temperature portions Q of the fixing belt 30 are pressed at the second pressure.

Since the high temperature portions Q under the second pressure receives small pressure, the oil film thickness h of the lubricating oil increases. That is, as illustrated in the Stribeck curve described with reference to FIG. 4, the oil film thickness h of the lubricating oil becomes thicker, and the state in FIG. 6A shifts to the state in FIG. 6B. The lubricating oil in each high temperature portion Q shifts from the boundary lubrication region or the mixed lubrication region to the hydrodynamic lubrication region. The lubricating oil in the low temperature portion P remains in the hydrodynamic lubrication region.

In the present embodiment, preferably the wear of the fixing belt 30 or the heater 32 can further be suppressed because the lubricating oil causes the fixing belt 30 to be out of contact with the heater 32.

The pressure roller driver 40 may rotate the pressure roller 31 at a linear velocity v that is a second linear velocity $v_2$ higher than a first linear velocity $v_1$ during the non-job processing.

The first linear velocity $v_1$ is a linear velocity v at which the pressure roller 31 rotates the fixing belt 30 during a normal warm-up period or a blank period, and is a linear velocity v while no imbalance occurs in the oil film thickness h of the lubricating oil. The first linear velocity $v_1$ may be lower than a linear velocity v during the fixing operation.

The second linear velocity $v_2$ is a linear velocity v at which the pressure roller 31 rotates the fixing belt 30 during a normal warm-up period or a blank period, and is a linear velocity v when imbalance occurs in the oil film thickness h of the lubricating oil. The second line velocity $v_2$ may be higher than the first line velocity $v_1$.

That is, the second linear velocity $v_2$ may be higher than the first linear velocity $v_1$ and may be lower than the linear velocity v during the fixing operation.

As illustrated in FIG. 5A, the pressure roller driver 40 controls and makes the pressure roller 31 rotate at the second linear velocity $v_2$.

When the fixing belt 30 is rotated at the second linear velocity $v_2$, the oil film thickness h of the lubricating oil becomes thicker in each high temperature portion Q of the fixing belt 30, and the state in FIG. 6A shifts to the state in FIG. 6B. Since the value of (viscosity η×linear velocity v) in (Equation 1) becomes large, the lubricating oil shifts from the boundary lubrication region or the mixed lubrication region to the hydrodynamic lubrication region.

In the present embodiment, preferably the wear of the fixing belt 30 or the heater 32 can further be suppressed because the lubricating oil causes the fixing belt 30 to be out of contact with the heater 32.

The power controller 43 controls electric power that is supplied to the heater 32. The power controller 43 supplies the heater 32 with second electric power smaller than first electric power during the non-job processing.

The first electric power is electric power that enables the pressure roller 31 to rotate the fixing belt 30 during the normal warm-up period or the blank period, and is electric power when no imbalance occurs in the oil film thickness h of the lubricating oil. The first electric power is smaller than electric power during the fixing operation.

The second electric power is electric power that enables the pressure roller 31 to rotate the fixing belt 30 during the normal warm-up period or the blank period, and is electric power when imbalance occurs in the oil film thickness h of the lubricating oil. The second electric power is smaller than the first electric power.

As illustrated in FIG. 8, the heater 32 includes a heat generator 44. The heat generator 44 is connected with electrodes 51. The electrodes 51 are connected to a power supply (not shown) and supply electric power to the heat generator 44.

The electrodes 51 includes electrodes 51a, 51b, and the like. The electrode 51a is connected to a side of the heat generator 44 on the downstream side in secondary scanning direction, and extends in parallel with the heat generator 44. The electrode 51b is connected to a side of the heat generator 44 on the upstream side in secondary scanning direction, and extends in parallel with the heat generator 44.

The electrode 51 may be divided in the primary scanning direction. The electrode 51 may allow a variable amount of electric energy to be selectively supplied to the low temperature portion P or the high temperature portions Q of the heat generator 44.

The heat generator 44 is supplied with electric power from the power supply (not shown) via the electrodes 51 to generate Joule heat, thereby heating the fixing belt 30.

The heat generator 44 extends in the primary scanning direction. The heat generator 44 is higher in resistivity than the material constituting the electrodes 51. For example, the heat generator 44 is a resistance heat generator such as silver-palladium (Ag/Pd), ruthenium oxide ($RuO_2$), and tantalum nitride ($Ta_2N$).

The heat generator 44 is formed by, for example, firing a paste such as ruthenium oxide after thick film printing. Note that the heat generator 44 may be formed by a thin film forming technology such as sputtering.

The electrodes 51 are made of, for example, resinate Au to which rhodium, vanadium, bismuth, silicon or the like is added as an additive element. The electrodes 51 may be formed by firing a paste of resinate Au after thick film printing. The electrodes 51 may be formed by a thin film forming technology such as sputtering. The electrodes 51 may be formed by laminating a plurality of Au layers.

As illustrated in FIG. 5A, the power controller 43 performs supply control of the second electric power to electrodes 51 corresponding to the high temperature portions Q of the heat generator 44.

When the second electric power is supplied to the electrodes 51 corresponding to the high temperature portions Q of the heat generator 44, the second electric power is selectively supplied to the electrodes 51 corresponding to the high temperature portions Q of the heater 32 illustrated in FIG. 5A. As a result, the high temperature portions Q of the heater 32 generate heat according to the second electric power.

Since the second electric power is smaller than the electric power during the fixing operation and the first electric power, the temperature of the high temperature portions Q of the heater 32 lowers. Therefore, as described with reference to FIG. 4, the oil film thickness h of the lubricating oil becomes thicker, and the lubricating oil in the high temperature portions Q shifts from the state of FIG. 6A to the state of FIG. 6B. That is, the lubricating oil in the high temperature portions Q shifts from the boundary lubrication region or the mixed lubrication region to the hydrodynamic lubrication region. The lubricating oil in the low temperature portion P remains in the hydrodynamic lubrication region.

In the present embodiment, preferably the wear of the fixing belt 30 or the heater 32 can further be suppressed because the lubricating oil causes the fixing belt 30 to be out of contact with the heater 32.

The power controller 43 may also control third electric power supplied to the heater 32 so that the low temperature portion P of the lubricating oil caused by the sheet S passing through the nip portion N (FIG. 3) is heated.

As described with reference to FIG. 5A, when the sheet S passes through the nip portion N between the heater 32 and the fixing belt 30, the sheet S absorbs heat. Therefore, the portion through which the sheet S has passed decreases in temperature, and becomes a low temperature portion P.

The power controller 43 controls the third electric power supplied to the heater 32 so that the low temperature portion P of the lubricating oil is heated. The electric power at this time may be larger than the first electric power supplied for the pressure roller 31 rotating the fixing belt 30 during the normal warm-up period or the blank period. Note that the third electric power may be larger or smaller than the electric power during the fixing operation.

The electrodes 51 connected to the heater 32 may be divided in the primary scanning direction, or may be selectively energized in the primary scanning direction.

As illustrated in FIG. 5A, the power controller 43 selectively supplies the third electric power to an electrode 51 corresponding to the low temperature portion P of the heater 32. Since the low temperature portion P of the heater 32 is heated, the temperature rises. Therefore, the oil film thickness $h_1$ decreases to the oil film thickness $h_3$, and the lubricating oil in the low temperature portion P shifts from the right side to the left side in the hydrodynamic lubrication region as illustrated in the Stribeck curve of FIG. 6B.

On the other hand, when the oil film thickness $h_1$ of the lubricating oil in the low temperature portion P decreases, the reduced amount of lubricating oil moves from the low temperature portion P to the high temperature portions Q of the heater 32. Therefore, the oil film thickness $h_2$ of the lubricating oil in the high temperature portions Q becomes the oil film thickness $h_3$. As a result, their thicknesses are flattened to the oil film thickness $h_3$ in the low temperature portion P and the high temperature portions Q of the lubricating oil.

In the present embodiment, the oil film thickness h of the lubricating oil in the nip portion N between the fixing belt 30 and the heater 32 is flattened, and the fixing belt 30 can be out of contact with the heater 32. Preferably, the wear of the fixing belt 30 or the heater 32 can further be suppressed.

Next, as illustrated in FIG. 9, the image forming apparatus 3 may include a cooling section 45 (45a, 45b). The cooling section 45 (45a, 45b) cools the high temperature portions Q of the lubricating oil due to the fact that the sheet S did not pass through the nip portion N.

As described with reference to FIG. 5A, the sheet S does not absorb heat in portions, through which the sheet S does not pass, of the nip portion N between the heater 32 and the fixing belt 30. Therefore, the portions through which the sheet S does not pass become the high temperature portions Q. The cooling section 45 (45a, 45b) cools the high temperature portions Q of the lubricating oil.

Fans are included in specific examples of the cooling section 45 (45a, 45b). The specific examples of the cooling section 45 (45a, 45b) may further include an electronic cooling elements such as Pelche elements.

As illustrated in FIG. 9, the cooling section 45 (45a, 45b) may be arranged at positions corresponding to the high temperature portions Q of the heat generator 44 of the heater 32. That is, the cooling section 45a may be placed at a position facing the high temperature portion Q of the heat generator 44 on the left side (positive side in the Y-direction). The cooling section 45b may be placed at a position facing the high temperature portion Q of the heat generator 44 on the right side (negative side in the Y-direction).

The cooling section 45 may cool the heater 32 during the fixing operation of the fixing device 16. The cooling section 45 may cool the heater 32 during the warm-up period or the blank period.

As described with reference to FIGS. 6A and 6B, when the cooling section 45 cools the high temperature portions Q of the heater 32, the temperature of the high temperature portions Q of the heater 32 decreases. Therefore, the oil film thickness $h_2$ becomes thicker and the oil film thickness $h_3$. As illustrated in the Stribeck curve of FIG. 6B, the lubricating oil of the high temperature portions Q shifts from the boundary lubrication region or the mixed lubrication region to the hydrodynamic lubrication region. The lubricating oil in the low temperature portion P may shift to the high temperature portions Q, or may decrease from the oil film thickness $h_1$ to the oil film thickness $h_3$. The lubricating oil in the low temperature portion P remains in the hydrodynamic lubrication region. Therefore, the low temperature portion P and the high temperature portions Q of the lubricating oil are flattened to the oil film thickness $h_3$.

In the present embodiment, the oil film thickness h of the lubricating oil in the nip portion N between the fixing belt 30 and the heater 32 is flattened, and the fixing belt 30 can be out of contact with the heater 32. Preferably, the wear of the fixing belt 30 or the heater 32 can further be suppressed.

The printer controller 10 (FIG. 2) can control the size of the sheet S that is supplied to the fixing device 16. The pressure roller driver 40 may rotate the pressure roller 31 according to the size of the sheet S so that the lubricating oil causes the fixing belt 30 to be out of contact with the heater 32.

That is, as illustrated in FIGS. 5A to 5C, the range of the low temperature portion P and the high temperature portions Q varies according to the size of the sheet S. The printer controller 10 can select and set the size of the sheet S that is supplied to the fixing device 16 according to job content.

When a sheet S passes through the entire heat generator 44 of the heater 32 (from positive side to negative side in the Y-direction), no temperature difference occurs in the heater 32. Therefore, the pressure roller driver 40 does not need to correct the temperature of the heater 32.

When a sheet S passes through part (between positive side and negative side in the Y-direction) of the heat generator 44 of the heater 32, the low temperature portion P and the high temperature portions Q occurs in the heater 32 as illustrated in FIG. 5A. Therefore, the pressure roller driver 40 controls the pressure roller 31 so that the temperature of the low temperature portion P is increased and the temperature of the high temperature portions Q is decreased.

The power controller 43 may control electric power based on the size of the sheet S. The cooling section 45 may cool the high temperature portions Q based on the size of the sheet S.

In the present embodiment, the oil film thickness h of the lubricating oil can be suitably controlled according to the size of the sheet S.

As illustrated in FIG. 8, the fixing device 16 of the image forming apparatus 3 may include a temperature measuring section 37. The temperature measuring section 37 measures the temperature of the lubricating oil and outputs temperature information. The pressure roller driver 40 may rotate the pressure roller 31 according to the temperature information so that the lubricating oil causes the fixing belt 30 to be out of contact with the heater 32.

As illustrated in FIG. 8, the temperature measuring section 37 may be placed at one end of the heat generator 44 in the primary scanning direction. That is, the temperature measuring section 37 may be placed at a position where the temperature of a high temperature portion Q illustrated in FIG. 5A can be measured.

The temperature measuring section 37 may measure the temperature of the heat generator 44. The temperature measuring section 37 may measure the temperature of the fixing belt 30. The temperature measuring section 37 may measure (predict) the temperature of the lubricating oil by measuring the temperature of the heat generator 44 or the fixing belt 30.

Examples of the temperature measuring section 37 include a thermistor, a thermostat, and a thermocouple.

The power controller 43 may control electric power based on the temperature information. The cooling section 45 may cool the high temperature portions Q based on the temperature information.

In the present embodiment, the oil film thickness h of the lubricating oil can be suitably controlled according to the temperature of the high temperature portion Q measured by the temperature measuring section 37.

The image forming apparatus 3 according to the present embodiment may further include a counter 46. The counter 46 counts the cumulative number of sheets S processed in one job or the cumulative number of sheets S processed since the image forming apparatus 3 was installed, and outputs count information. The pressure roller driver 40 may rotate the pressure roller 31 so that the lubricating oil causes the fixing belt 30 to be out of contact with the heater 32 when the count information exceeds a threshold value.

The counter 46 can be realized by an application specific integrated circuit (ASIC). For example, supposing that the cumulative number of sheets S processed in one job is 100, when the threshold value of the cumulative number of sheets S processed in one job is set to 50. In this case, the counter 46 counts 100 sheets, and then outputs count information indicating that the count value exceeds the threshold value.

Supposing that the counter 46 counts that the cumulative number of sheets is 600 when the threshold value of the cumulative number since the image forming apparatus 3 was installed in the office is set to 500, for example. In this case, the counter 46 outputs count information indicating that the cumulative number exceeds the threshold value.

The pressure roller driver 40 drives the pressure roller 31 based on the count information indicating that the cumulative number exceeds the threshold value so that the lubricating oil causes the fixing belt 30 to be out of contact with the heater 32. All specific examples of the present embodiment can be applied as a specific driving method.

The drive controller 41 may predict, through calculation, the maximum temperature (T max) of the lubricating oil.

The drive controller 41 may determine whether or not the maximum temperature (T max) of the lubricating oil exceeds a first threshold value (A [° C.]).

The cooling section 45 may cool the high temperature portions Q when the maximum temperature (T max) of the lubricating oil exceeds the first threshold value (A [° C.]).

The pressure roller driver 40 may rotate the pressure roller 31 at a linear velocity v that is the second line velocity $v_2$ higher than the first line velocity $v_1$ during the non-job processing when the maximum temperature (T max) of the lubricating oil exceeds the first threshold value (A [° C.]).

The drive controller 41 may determine whether or not the maximum temperature (T max) of the lubricating oil exceeds a second threshold value (B [° C.]) higher than the first threshold value (A [° C.]). That is, the driving time of the pressure roller 31 may be varied according to whether the maximum temperature (T max) of the lubricating oil is higher than the first threshold value (A [° C.]) and lower than the second threshold value (B [° C.]), or whether the maximum temperature (T max) of the lubricating oil is higher than the second threshold value (B [° C.]).

The drive controller 41 may drive the pressure roller 31 by increasing the drive time by (+a-seconds) when it is determined that the second threshold value (B [° C.]) is not exceeded.

The drive controller 41 drives the pressure roller 31 by increasing the drive time more than the a-seconds (+b-seconds) when it is determined that the second threshold value (B [° C.]) is exceeded.

In the present embodiment, the oil film thickness h of the lubricating oil can be suitably controlled according to the number of sheets S processed by the fixing device 16.

The image forming apparatus 3 may further include a timer 47. The timer 47 may measure the cumulative time processed by one job or the cumulative time that has elapsed since the image forming apparatus 3 was installed, and output cumulative time information. The pressure roller driver 40 may rotate the pressure roller 31 so that the lubricating oil causes the fixing belt 30 to be out of contact with the heater 32, when the cumulative time information exceeds a threshold value (T min).

The timer 47 can be realized by an ASIC. Supposing that the timer 47 measures that the cumulative time processed by one job is 2 minutes when the threshold value (T min) of the cumulative time processed by one job is set to 1 minute, for example. In this case, the timer 47 outputs timer information indicating that the cumulative time exceeds the threshold value (T min).

Supposing that the timer 47 measures that the cumulative time is 60 hours when the threshold value (T min) of the cumulative time that has elapsed since the image forming apparatus 3 was installed in the office is set to 50 hours, for example. In this case, the timer 47 outputs timer information indicating that the cumulative time exceeds the threshold value (T min).

The pressure roller driver 40 drives the pressure roller 31 based on the timer information indicating that the cumulative time exceeds the threshold value (T min) so that the lubricating oil causes the fixing belt 30 to be out of contact with the heater 32. All specific examples of the present embodiment can be applied as a specific driving method.

The drive controller 41 may predict, through calculation, the maximum temperature (T max) of the lubricating oil.

The drive controller 41 may determine whether or not the maximum temperature (T max) of the lubricating oil exceeds a first threshold value (A [° C.]).

The cooling section 45 may cool the high temperature portions Q when the maximum temperature (T max) of the lubricating oil exceeds the first threshold value (A [° C.]).

The pressure roller driver 40 may rotate the pressure roller 31 at a linear velocity v that is the second linear velocity $v_2$ higher than the first linear velocity $v_1$ during the non-job processing, when the maximum temperature (T max) of the lubricating oil exceeds the first threshold value (A [° C.]).

The drive controller 41 may determine whether or not the maximum temperature (T max) of the lubricating oil exceeds a second threshold value (B [° C.]) higher than the first threshold value (A [° C.]).

The drive controller 41 may drive the pressure roller 31 by increasing the drive time by (+a-seconds) when it is determined that the second threshold value (B [° C.]) is not exceeded.

The drive controller 41 drives the pressure roller 31 by increasing the drive time more than the a-seconds (+b-seconds) when it is determined that the second threshold value (B [° C.]) is exceeded.

In the present embodiment, the oil film thickness h of the lubricating oil can be suitably controlled according to the cumulative time processed by the fixing device 16.

As illustrated in FIGS. 10 and 11, the heater 32 may include a first heating piece 440b, and second heating pieces 440a and 440c adjacent to the first heating piece 440b in the primary scanning direction.

As illustrated in FIG. 10, the fixing device 16 includes the heater 32, the heat generator 44, the electrodes 51, and the temperature measuring section 37. As illustrated in FIG. 11, the fixing device 16 further includes the cooling section 45.

The heat generator 44 includes a plurality of heating pieces 440. The heating pieces 440 include the first heating piece 440b, the second heating pieces 440a and 440c, and the like.

As described with reference to FIG. 5A, for example, when a small-sized sheet S is fixed, the sheet S passes through the first heating piece 440b. Therefore, the lubricating oil in the first heating piece 440b corresponds to the low temperature portion P in FIG. 5A. The lubricating oil in the second heating pieces 440a and 440c corresponds to the high temperature portions Q in FIG. 5A.

As illustrated in FIG. 10, the electrodes 51 includes an electrode 51c, an electrode 51d, an electrode 51e, and the like. The first heating piece 440b is connected to the electrode 51c. The second heating piece 440a is connected to the electrode 51d. The second heating piece 440c is connected to the electrode 51e. The electrodes 51 are connected to a power supply (not shown), and supply electric power to the heat generator 44.

The electrode 51c is connected to the side of the first heating piece 440b on the downstream side in the secondary direction and extends in parallel with the first heating piece 440b. The electrode 51d is connected to respective sides of the second heating pieces 440a and 440c on the downstream side in the secondary direction, and extends in parallel with the second heating pieces 440a and 440c. The electrode 51e is connected to respective sides of the first heating piece 440b and the second heating pieces 440a and 440c on the upstream side in the secondary direction, and extends in parallel with the first heating piece 440b and the second heating pieces 440a and 440c.

Each of the electrodes 51c, 51d, and 51e may further be divided in the primary scanning direction. The electrodes 51 may allow a variable amount of electric energy to be selectively supplied to the low temperature portion P or the high temperature portions Q of the heat generator 44.

The heat generator 44 is supplied with electric power from a power supply (not shown) via the electrodes 51 to generate Joule heat, thereby heating the fixing belt 30.

As illustrated in FIG. 10, the temperature measuring section 37 includes a temperature measuring section 37a, a temperature measuring section 37b, and the like. The temperature measuring section 37a is placed in the vicinity of the first heating piece 440b, and measures the temperature of the lubricating oil in the first heating piece 440b to output temperature information. The temperature measuring section 37b is placed in the vicinity of the second heating piece 440c, and measures the temperature of the lubricating oil in the second heating piece 440c to output temperature information. The temperature measuring section 37b may be placed in the vicinity of the second heating piece 440c.

The temperature measuring section 37a may be placed at an end of the first heating piece 440b (an end on a positive or negative side in the Y-direction). Supposing that a small-sized sheet S has a width smaller than the width of the first heating piece 440b in the primary scanning direction. When fixing processing is applied to the small-sized sheet S, an end of the first heating piece 440b in the primary scanning direction (an end on a positive or negative side in the Y-direction) may be a high temperature portion Q described in FIG. 5A.

The temperature measuring section 37b may be placed at the end of the second heating piece 440c in the primary scanning direction (the end on the negative side in the Y-direction). Supposing that a medium-sized sheet S has a width that is larger than the width of the first heating piece 440b in the primary scanning direction and smaller than the width of the second heating piece 440c in the primary scanning direction. When fixing processing is applied to the medium-sized sheet S, the end of the second heating piece 440c in the primary scanning direction (on the negative side in the Y-direction) may be a high temperature portion Q.

As illustrated in FIG. 11, the cooling section 45 includes a cooling section 45c, a cooling section 45d, a cooling section 45e, a cooling section 45f, and the like.

The cooling sections 45d and 45e may be placed at an end of a first heating piece 440b in the primary scanning direction (on a positive or negative side in the Y-direction). Supposing that a small-sized sheet S has a width smaller than the width of the first heating piece 440b in the primary scanning direction. When fixing processing is applied to the small-sized sheet S, the end of the first heating piece 440b in the primary scanning direction (on a positive or negative side in the Y-direction) may be a high temperature portion Q.

The cooling section 45c may be placed at an end of a second heating piece 440a in the primary scanning direction (on the positive side in the Y-direction). Supposing that a medium-sized sheet S has a width that is larger than the width of the first heating piece 440b in the primary scanning direction and smaller than the width of the second heating piece 440a in the primary scanning direction. When fixing processing is applied to the medium-sized sheet S, the end of the second heating piece 440a in the primary scanning direction (on the positive side in the Y-direction) may be a high temperature portion Q.

The cooling section 45f may be placed at an end of a second heating piece 440c in the primary scanning direction (on the negative side in the Y-direction). Supposing that a medium-sized sheet S has a width that is larger than the width of the first heating piece 440b in the primary scanning direction and smaller than the width of the second heating piece 440c in the primary scanning direction. When fixing processing is applied to the medium-sized sheet S, the end of the second heating piece 440c in the primary scanning direction (on the negative side in the Y-direction) may be a high temperature portion Q.

The cooling section 45c, the cooling section 45d, the cooling section 45e, and the cooling section 45f may cool a corresponding high temperature section Q.

As illustrated in FIG. 5A, when fixing processing is continuously applied to sheets S that are smaller in size than the first heating piece 440b, lubricating oil in each end of the first heating piece 440b becomes hot. As a result, the center of the first heating piece 440b becomes a low temperature portion P, and both ends of the first heating piece 440b become high temperature portions Q. The pressure roller driver 40 controls the pressure roller 31 so that second pressure is applied to the fixing belt 30.

Similarly, when fixing processing is continuously applied to medium-sized sheets S that are larger in size than the first heating piece 440b, lubricating oil in each end of the first heating piece 440b becomes hot. As a result, lubricating oil in the first heating piece 440b becomes a low temperature portion P, and the second heating pieces 440a and 440c become high temperature portions Q. The pressure roller driver 40 controls the pressure roller 31 so that second pressure is applied to the fixing belt 30.

The pressure roller driver 40 may rotate the pressure roller 31 at a linear velocity v that is a second linear velocity $v_2$ higher than the first linear velocity $v_1$ during non-job processing.

The power controller 43 controls electric power supplied to the heater 32. The power controller 43 may supply the heater 32 with second electric power smaller than first electric power during the non-job processing.

The power controller 43 may perform supply control of the second electric power to the electrode 51c corresponding to the high temperature part Q of the first heating piece 440b.

In the present embodiment, the first heating piece 440b and the second heating pieces 440a and 440c can be used properly according to the size of sheets S. The low temperature portion P and the high temperature portions Q of the lubricating oil can be clearly distinguished, and therefore the temperature of the lubricating oil can be efficiently adjusted.

Figure 12:
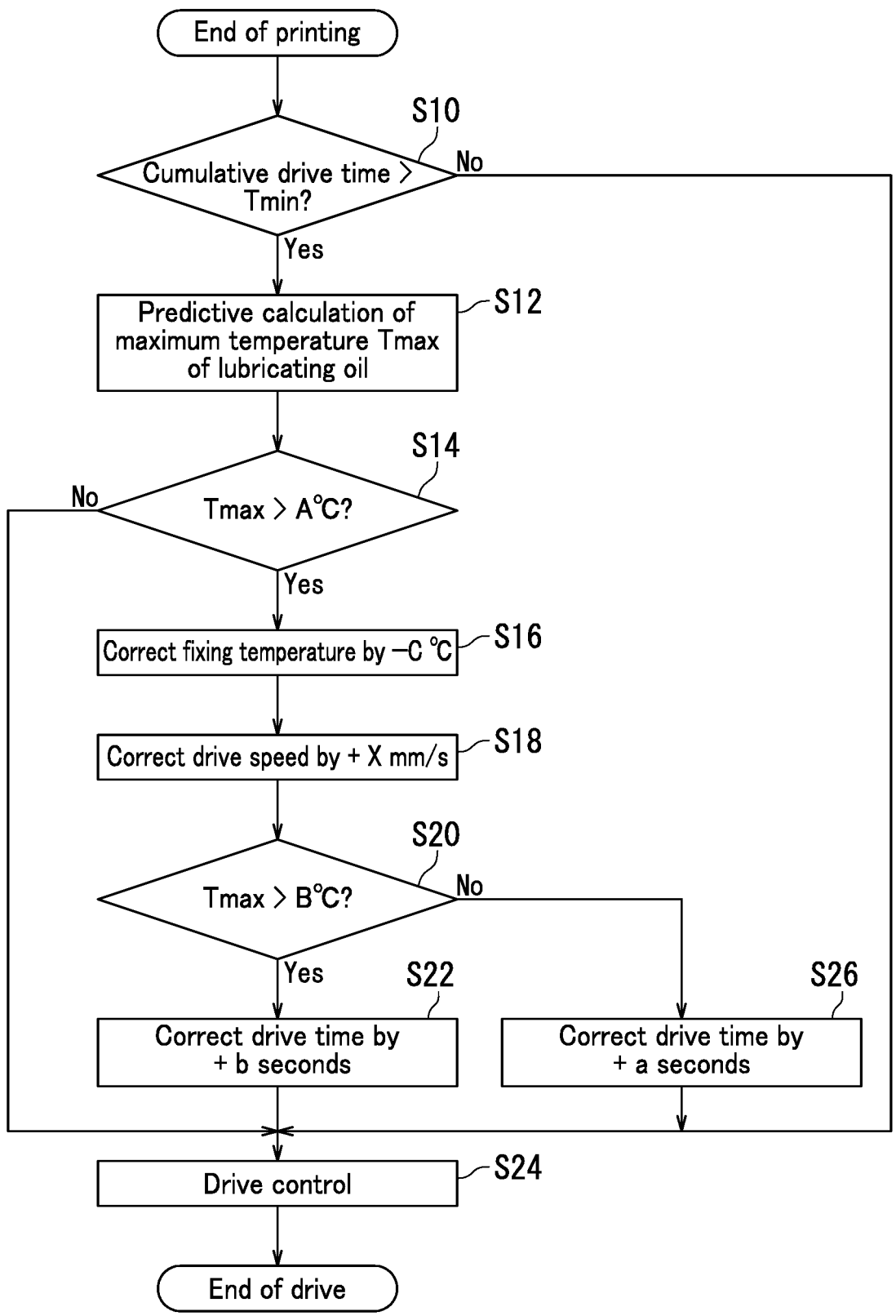
FIG. 12 is a flowchart illustrating the control of an image forming apparatus according to the present embodiment.

Control of the image forming apparatus 3 according to the present embodiment will be described with reference to FIG. 12. FIG. 12 is a flowchart illustrating the control of the image forming apparatus 3 according to the present embodiment. As illustrated in FIG. 12, the flowchart includes Steps S10 to S26.

In Step S10 in FIG. 12, the pressure roller driver 40 determines whether or not cumulative drive time of the pressure roller 31 exceeds a predetermined time (Y min). If it is exceeded (Yes in Step S10), the process proceeds to Step S12. If it is not (No in Step S10), the process proceeds to Step S24.

In Step S12, the drive controller 41 predicts, through calculation, a maximum temperature (T max) of a lubricating oil. The process then proceeds to Step S14.

In Step S14, the drive controller 41 determines whether or not the maximum temperature (T max) of the lubricating oil exceeds a first threshold value (A [° C.]). If it is exceeded (Yes in Step S14), the process proceeds to Step S16. If it is not (No in Step S14), the process proceeds to Step S24.

In Step S16, the power controller 43 corrects fixing temperature by −C [° C.]. The process then proceeds to Step S18.

In Step S18, the drive controller 41 corrects a drive speed by +X [mm/s]. The process then proceeds to Step S20.

In Step S20, the drive controller 41 determines whether or not the maximum temperature (T max) of the lubricating oil exceeds a second threshold value (B [° C.]). If it is exceeded (Yes in Step S20), the process proceeds to Step S22. If it is not, the process proceeds to Step S26.

In Step S22, the drive controller 41 corrects the drive time by +b [second]. The process then proceeds to Step S24.

In Step S24, the drive controller 41 performs drive control of the pressure roller driver 40. The process then ends.

In Step S20, if No, the drive controller 41 corrects the drive time by +a [second]. The process then proceeds to Step S24.

In Step S14, if No, the process proceeds to Step S24.

In Step S12, if No, the process proceeds to Step S24.

The embodiment of the present disclosure has been described above with reference to the drawings. However, the present disclosure is not limited to the above-described embodiment, and may be implemented in various aspects without departing from the gist thereof. The drawings schematically illustrate each component as a main body in order to make it easier to understand. The thickness, length, number, and the like of illustrated components may differ from the actual ones for the convenience of the drawing. Further, the material, shape, dimensions or the like of each component illustrated in the above embodiment are examples and not particularly limited, and various modifications may be made without substantially deviating from the effects of the present disclosure.

What is claimed is:

1. An image forming apparatus that executes job processing for forming a toner image based on image data on a sheet, comprising a fixing device, wherein the fixing device includes:
    a fixing belt that heats and fixes the toner image transferred to the sheet;
    a pressure roller that rotates the fixing belt while in contact with the fixing belt;
    a heater that heats the fixing belt;
    a power controller that controls electric power supplied to the heater to set the fixing belt at a fixing temperature;
    a lubricating oil that forms an oil film between the heater and an inner peripheral surface of the fixing belt; and
    a pressure roller driver that rotates the pressure roller so that the lubricating oil causes the fixing belt to be out of contact with the heater, wherein
    when fixing by the fixing device in the job processing ends, the power controller executes a correction to decrease the fixing temperature by controlling the heater, and the pressure roller driver sets a predetermined drive time and continues rotating the pressure roller for the predetermined drive time.

2. The image forming apparatus according to claim 1, wherein the pressure roller driver decreases pressure of the pressure roller on the fixing belt to second pressure lower than first pressure during non-job processing when at least part of the fixing belt is out of contact with at least part of the heater without the lubricating oil therebetween.

3. The image forming apparatus according to claim 1, wherein the pressure roller driver rotates the pressure roller at a linear velocity that is a second linear velocity higher than a first linear velocity during non-job processing.

4. The image forming apparatus according to claim 1, wherein
    the power controller supplies the heater with second electric power smaller than first electric power during non-job processing.

5. The image forming apparatus according to claim 1, wherein
    the power controller controls third electric power supplied to the heater so that a low temperature portion is heated, the low temperature portion being a portion of the lubricating oil caused by the sheet passing through a nip portion.

6. The image forming apparatus according to claim 1, further comprising a cooling section that cools a high temperature portion of the lubricating oil due to the sheet not passing through a nip portion.

7. The image forming apparatus according to claim 1, further comprising a printer controller that controls a size of the sheet to be supplied to the fixing device, wherein
    the pressure roller driver rotates the pressure roller based on the size so that the lubricating oil causes the fixing belt to be out of contact with the heater.

8. The image forming apparatus according to claim 1, further comprising a temperature measuring section that measures a temperature of the lubricating oil to output temperature information,
    the pressure roller driver rotates the pressure roller based on the temperature information so that the lubricating oil causes the fixing belt to be out of contact with the heater.

9. The image forming apparatus according to claim 1, further comprising a counter that outputs count information by counting a cumulative number of sheets processed in one job or a cumulative number of sheets processed since the image forming device was installed, wherein
    the pressure roller driver rotates the pressure roller so that the lubricating oil causes the fixing belt to be out of contact with the heater, when the count information exceeds a threshold value.

10. The image forming apparatus according to claim 1, further comprising a timer that outputs cumulative time information by measuring a cumulative time processed by one job or a cumulative time that has elapsed since the image forming apparatus was installed, wherein
    the pressure roller driver sets the predetermined drive time and rotates the pressure roller for the predetermined drive time so that the lubricating oil causes the fixing belt to be out of contact with the heater, when the cumulative time information exceeds a threshold value.

11. The image forming apparatus according to claim 1, wherein the heater includes a first heating piece and a second heating piece adjacent to the first heating piece in a primary scanning direction.

* * * * *